E. THOMSON.
ELECTRIC BATTERY SYSTEM AND METHOD OF OPERATING THE SAME.
APPLICATION FILED AUG. 27, 1919.

1,396,541.

Patented Nov. 8, 1921.

Inventor:
Elihu Thomson,
by Albert G. Davis
His Attorney.

UNITED STATES PATENT OFFICE.

ELIHU THOMSON, OF LYNN, MASSACHUSETTS, ASSIGNOR TO GENERAL ELECTRIC COMPANY, A CORPORATION OF NEW YORK.

ELECTRIC-BATTERY SYSTEM AND METHOD OF OPERATING THE SAME.

1,396,541.     Specification of Letters Patent.     Patented Nov. 8, 1921.

Application filed August 27, 1919. Serial No. 320,274.

*To all whom it may concern:*

Be it known that I, ELIHU THOMSON, a citizen of the United States, residing at Lynn, in the county of Essex, State of Massachusetts, have invented certain new and useful Improvements in Electric-Battery Systems and Methods of Operating the Same, of which the following is a specification.

This invention relates to an electric battery system and method of operating the same to supply current to an internal combustion engine starting motor, and more particularly it relates to an efficient arrangement and combination of electric batteries of different types and characteristics especially adapted to supply a suitable current to a starting motor for automobile engines.

The modern automobile power equipments include a starting motor for the engine adapted to be clutched to the engine shaft at starting, to drive it and produce the initial compressions of the explosive mixture in the cylinders. The starting motor in such an equipment is supplied with current from a storage battery, which is usually also utilized to supply current to the lighting system of the vehicle.

In such equipments a high initial current discharge from the battery is required to start the motor and overcome the inertia of the moving parts of the engine, but after the initial compression in the engine, the current required for operating the motor drops off considerably below that required for starting.

The object of my invention is to provide an efficient battery system adapted to supply the initially high current discharge rate required to start the motor as well as to supply a current suitable for the operation of the motor and for the lighting system of an automobile.

Figure 3:
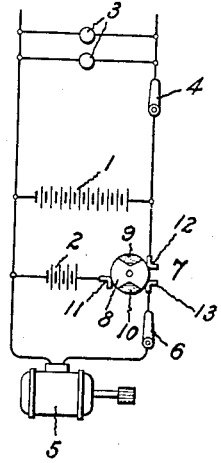
Figure 4:
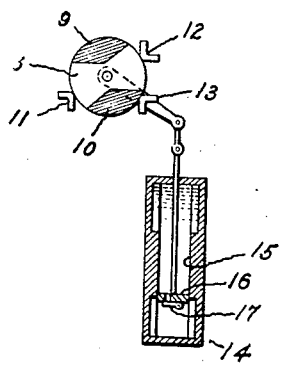

In carrying my invention into effect, I provide a system including main and auxiliary batteries, which batteries, while designed to deliver currents of the same voltage, have distinctly different current storage capacities and discharge rates; the main battery being one of high internal resistance relatively large storage capacity, and relatively low discharge rate, such as the Edison or "nickel-iron-alkaline" battery, and the auxiliary battery being one of low internal resistance and small storage capacity capable of giving a high discharge rate for a short period, such as the ordinary lead or polarization battery. I so arrange these batteries, in a system especially adapted for automobile starting, that the peculiar characteristics of both types are taken advantage of; the Edison battery being normally utilized to supply the current for the lights and the lead or polarization battery being connected in the motor circuit, preferably in parallel with the Edison battery, only during the starting period. My invention also includes an arrangement of switches whereby the necessary connections may be made for charging the lead cells from the Edison battery; for connecting the two batteries in parallel to the motor for starting, and for cutting out the lead cells and motor after starting and also during the charging of the Edison battery. Other objects and advantages of my invention will appear hereinafter in the description of the particular embodiment illustrated in the accompanying drawing in which Figures 1, 2 and 3 are diagrammatic representations of the system with the switching apparatus in its various positions and in which Fig. 4 is a representation of one form of means for giving the switch a slow motion during a part of its movement.

In the drawing there is represented at 1 a battery of the Edison type and at 2 a battery of the polarization type. The battery 1 is adapted to be connected to supply the lamps 3 through a switch 4. The starting motor for the internal combustion engine, not shown, is represented at 5. A circuit closing device 6 is arranged in the circuit of the motor. A rotary switch 7 provided with a conducting segment 8 and insulating segments 9 and 10 coöperates with three brushes 11, 12, and 13 connected respectively to battery 2, battery 1 and the starting motor.

Figure 1:
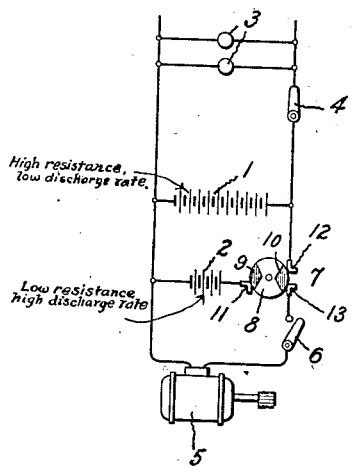

In Fig. 1 the battery 1 is shown as connected to the lamp circuit 3 while the position of the switch 7 is such that the brushes 11, 12, and 13 rest on the insulating segments of the switch so that the circuits of the battery 2 and starting motor are open.

Figure 2:
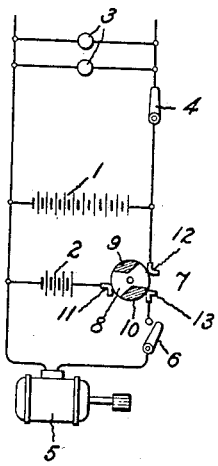

In Fig. 2 the switch 7 is represented as having been turned in a clockwise direction so that a circuit is completed between brushes 11 and 12 by contact segment 8. In this position the Edison type battery 1 will supply charging current to the battery 2.

In Fig. 3 the switch 7 is represented as having been further rotated to a position in which 11, 12 and 13 are all interconnected by means of the contact segment 8. The batteries 1 and 2 are therefore connected in parallel and the switch 6 having been closed the batteries will together supply a heavy current for starting the motor 5.

After the internal combustion engine has started the switch 7 will be returned to the open circuit position shown in Fig. 1. At this time the battery 1 may be recharged in any well-known manner either by means of a separate generator driven from the internal combustion engine or by means of the dynamo electric machine 5 where it is desired to use the same unit as the starting motor and the charging generator. This charging circuit will be closed in any well-known way when the voltage of the generator is sufficient for charging the battery. Inasmuch as these arrangements for recharging battery 1 are old and well-known and form no part of my present invention they have not been illustrated.

It will be noted that in my system the polarization battery 2 receives its charge from the battery 1 during an interval just prior to the moment that the engine is to be started. Where switching means, such as that illustrated, is used it is desirable to provide some means which will cause the connection shown in Fig. 2 to be maintained for an appreciable interval in order that the battery 2 may become sufficiently charged to perform its function in the combination. One form of such means is shown in Fig. 4. A dash-pot 14 is here shown provided with an intermediate portion 15 which fits piston 16 sufficiently tightly to retard the motion of the switch in the clockwise direction. Grooves in the wall of the dash-pot at each end of the intermediate portion 15 permit the piston to move freely through the end portions. The piston is provided with a valve 17 which permits free movement of the switch in a counter-clockwise direction throughout its entire motion. As thus arranged, it is apparent that the switch 7 can be quickly moved from the open circuit position of Fig. 1 to a position in which the batteries 1 and 2 are connected in parallel, and that this connection will be maintained for an appreciable interval owing to the retarding action of the intermediate portion of the dash-pot. At the completion of the charging interval the dash-pot will permit the switch to be moved quickly to the position in which the starting motor is connected to the batteries.

The operation of my invention will be obvious from the preceding description. When it is desired to start the engine the switch 7 is rotated either directly or through remote control mechanism from the position shown in Fig. 1 to that shown in Fig. 3. While the switch is traversing that portion of its movement during which the connections shown in Fig. 2 obtain, the battery 2 is recharged from battery 1. At the moment the connections shown in Fig. 3 are established both batteries supply starting current to the motor, the necessary initial heavy rush of starting current coming mainly from battery 2.

While I have illustrated a particular switching means, it is obvious that any switching means may be substituted in my combination which will permit the elements of the combination to coöperate in the manner I have set forth. It is clearly possible to perform the steps of my method by means of independent switches manually operated in the desired sequence.

Some of the advantages of my invention may be secured by using an ordinary lead storage battery for the battery 1, since in this case the battery 1 may be made considerably smaller than necessary to provide the large starting current necessary. One of the advantages of an Edison type battery in the combination, however, resides in the fact that it will not be injured by being connected directly across discharged battery 2 and it therefore becomes unnecessary to provide external resistances for limiting the current between batteries when this connection is made.

What I claim as new and desire to secure by Letters Patent of the United States, is:

1. In combination in a motor starting system for combustion engines, a storage battery of relatively low capacity and low internal resistance adapted to deliver current at a high discharge rate, a second storage battery of relatively high capacity high internal resistance adapted to deliver current at a relatively low discharge rate, and switch means provided with contacts adapted to interconnect said batteries for charging the first mentioned from the last mentioned battery and for connecting said batteries in parallel to supply current to the starting motor.

2. In a starting and lighting system the combination of a starting motor, a lighting circuit, a storage battery of relatively high storage capacity and low discharge rate, connections whereby said battery may supply the lighting circuit, a polarization battery adapted to discharge at a high rate for a short interval, and switch means adapted first to connect the polarization battery to the other battery for an interval normally sufficient to enable the polarization battery to become charged and then to connect both batteries in parallel to the starting motor.

3. The method of operating an internal combustion engine starting system comprising a dynamo-electric machine, a battery having a small storage capacity and high discharge rate and a battery having a relatively large storage capacity and a low discharge rate, which comprises connecting the small capacity battery to the large capacity battery to be charged therefrom and then connecting both batteries to the dynamo electric machine to operate the same as a motor to start the engine.

4. The method of operating a system comprising a dynamo electric machine, a battery of relatively large storage capacity and limited discharge rate and a battery of relatively small storage capacity and high discharge rate, which comprises connecting the batteries in parallel to discharge current at a high rate to start the dynamo-electric machine as a motor and connecting the battery of small storage capacity to the large capacity battery to be recharged at a low rate between successive discharges.

In witness whereof, I have hereunto set my hand this 21st day of August, 1919.

ELIHU THOMSON.